Dec. 26, 1967

M. SAGALOW 3,360,669

SQUIRREL-CAGE ROTOR

Filed March 1, 1965

MORTON SAGALOW
INVENTOR.

BY

Thomas W. Kennedy
ATTORNEY

United States Patent Office 3,360,669
Patented Dec. 26, 1967

3,360,669
SQUIRREL-CAGE ROTOR
Morton Sagalow, West Orange, N.J., assignor to General Precision Inc., Little Falls, N.J., a corporation of Delaware
Filed Mar. 1, 1965, Ser. No. 436,111
4 Claims. (Cl. 310—211)

ABSTRACT OF THE DISCLOSURE

A squirrel-cage rotor is made by positioning a hollow tube with inwardly projecting elongated projections over a core with corresponding grooves, the ends of the tube overhanging the core, and, applying a high-intensity pressure to the tube radially-outer surface to cause the tube projections to fill the core grooves.

---

This invention relates to squirrel-cage induction motors, and particularly to a rotor for a squirrel-cage motor and a method of manufacture thereof.

A conventional squirrel-cage induction motor has an outer stator body and an inner rotor body rotatable relative to the stator. The stator has a coil support with a plurality of radial teeth, which are wound with field coils. The rotor, which is journaled in the stator, has an iron core which supports a conductor cage. The cage, which has a squirrel-cage shape, has a plurality of peripherally-spaced conductive bars connected to a pair of end rings.

A conventional method of manufacturing such a squirrel-cage rotor includes the steps of temporarily mounting the cage bars on the iron core and then die-casting the cage end rings to the bars. One problem with such method is the formation of voids in the cast parts thereby minimizing the strength of the rotor, and repeatability in manufacture.

In accordance with one embodiment of the present invention, squirrel-cage rotors without cast parts can be manufactured by a method including the steps of positioning a tube of predetermined design over an iron core of predetermined design, and then applying a predetermined high-intensity pulsed magnetic field over the exterior surface of the tube. A magnetic-pulse forming device, which can provide such field, is described in U.S. Patent No. 2,976,907.

Accordingly, it is one object of the invention to eliminate cast parts in a squirrel-cage rotor.

It is another object of the invention to provide a squirrel-cage rotor having an iron core usable as a die for radially forming its one-piece cage.

It is a further object of the invention to provide a method of manufacture of the aforementioned squirrel-cage rotor using the operation of magnetic-pulse forming.

To the fulfillment of these and other objects, a squirrel-cage rotor comprising a metal tube with a longitudinal axis and a metal core which coaxially supports said tube is provided. The tube has a pair of axially-spaced annular end portions and has a plurality of peripherally-spaced elongate slots forming therebetween bars of trapezoidal cross-section for interconnecting said end portions. The core has a pair of end faces respectively abutting said tube end portions and has a plurality of peripherally-spaced grooves with radially-outwardly-diverging groove side walls for receiving said tube bars.

Other objects of the invention will become apparent upon reading the annexed detailed description in connection with the drawings wherein like parts are designated by like numerals throughout the several views, and wherein.

Figure 1:
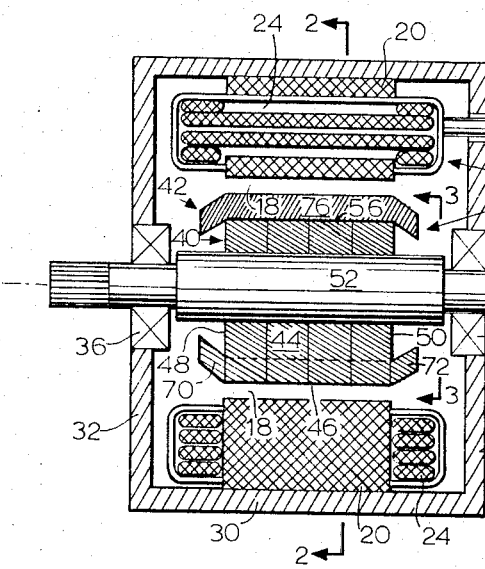
FIG. 1 is a sectional view of a squirrel-cage motor embodying features of the invention.

Referring to the drawings, one embodiment of the present invention is a motor 10, comprising a stator or outer body 12 and a rotor or inner body 14, which is rotatable relative thereto about a longitudinal axis 16 and which is separated therefrom in a radial direction by a narrow annular gap 18.

Stator 12 comprises an annular coil support 20, which is coaxially mounted in a cylindrical housing 22, and also a plurality of field coils 24, which are supported from coil support 20 and which are peripherally spaced about axis 16.

Figure 2:
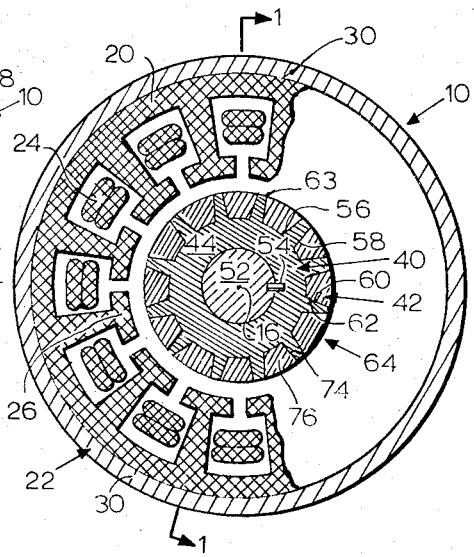
FIG. 2 is a sectional view as taken on line 2—2 of FIG. 1.

Coil support 20 (FIG. 2), which is normally a laminated-iron construction, has a plurality of radially-inwardly-pointing T-shaped teeth 26 on which coils 24 are wrapped in a conventional manner. Coils 24 (FIG. 1) have a power supply lead 28, which extends through housing 22.

Housing 22 includes a peripheral wall 30 and a pair of axially-spaced end walls 32, 34, which enclose coils 24. Walls 32, 34 respectively have coaxial bearings 36, 38.

Rotor 14 comprises a metal core 40 and a coaxial tube 42. Core 40 (FIG. 1, 2) has an annular laminated iron portion 44 with a radially outer surface 46 that is concentric about axis 16 and with a pair of axially-spaced end faces 48, 50. Core 40 also has a shaft portion 52, which is joined to annular portion 44 by a key member 54 and which is journaled in bearings 36, 38 for rotation relative to stator 12.

Radially outer surface 46 (FIG. 2, 5) has a plurality of peripherally spaced helical grooves 56 with radially-outwardly-diverging groove side walls 58, 60 for forming a plurality of helical apex portions 62 therebetween. Apex portions 62 respectively have radially-outwardly-facing tip portions 63.

Figure 5:
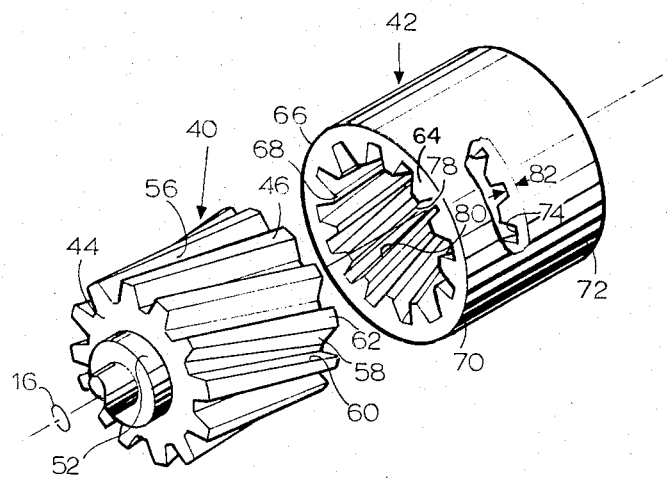
FIG. 5 is an isometric view of a portion of FIG. 1 prior to the manufacture thereof.
Figure 6:
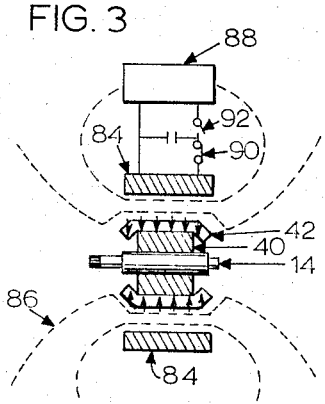
FIG. 6 is a schematic view of said portion of FIG. 1 during the manufacture thereof.

Tube 42 (FIGS. 2, 5) has a wall 64 with a concentric radially outer surface 66 and a radially inner surface 68 and with axially-spaced end portions 70, 72, which overlap end faces 48, 50, respectively. Wall 64 has a plurality of slots or grooves 74, which extend through a portion of the radial thickness defined by the outer surface 66 and inner surface 68. Slots 74 have a similar angular spacing and a similar helical pitch as those of apex portions 62. Wall 64 has a plurality of bar portions 76, which are respectively interspaced between grooves 74 and which interconnect end portions 70, 72.

Slots 74 have oppositely-facing-radially-inwardly-diverging side walls 78, 80 whereby bars 76 have a trapezoidal cross-section. Slots 74 have bottom wall or web portions 82 (FIG. 5), having circumferential dimensions greater than that of corresponding tips 63 whereby at least a portion of each overlies a tip 63 of an adjacent apex 62. Bars 76 are respectively received in grooves 56 so as to extend below the surface of 46.

With the above-described structure of rotor 14, a certain type of forming operation, as explained hereafter, can be used for the redistribution of the wall thickness of the tube and for the reshaping of the individual portions of the tube wall 64. In this way, manufacture of tube 42 and assembly of tube 42 and core 40 is facilitated.

The method of manufacture of rotor 14, according to the invention, includes the following steps or operations, which preferably follow the sequence as indicated in the following paragraphs.

A hollow metal tube 42 is fabricated with the longitudinal axis 16 and with the radially outer surface 66 and a radially inner surface 68 which define a tube wall 64. A plurality of peripherally spaced helical grooves 74 are machined in the radially inner surface 68 with radially-inwardly-diverging groove side walls 78, 80 so that thickened bar portions 76 are formed between grooves 74 and so that thinner web portions 82 are formed radially opposite grooves 74. Webs 82 are substantially thicker at the portions adjacent end portions 70, 72 than at their portions intermediate said ends 70, 72.

A laminated-iron core 40 is fabricated having a radially outer surface 46 which has a larger diameter than tube radially inner surface 68. A plurality of peripherally-spaced helical grooves 56 are machined in radially outer surface 46 with radially-outwardly-diverging groove side walls 58, 60 forming apex portions 62 therebetween. Grooves 56 and apexes 62 have substantially the same angular spacing and helical pitch as grooves 74. Core 40 is also shorter in axial length than tube 42.

Core 40 is inserted in tube 42 when positioned so that tube 42 has a substantially equal overhang at each end thereof, and so that apex portions 62 are received in respective grooves 74.

Figure 4:
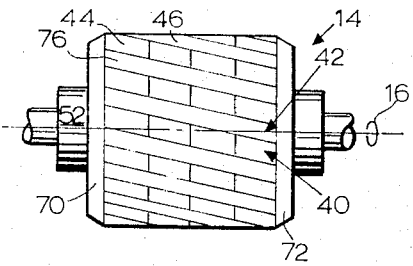
FIG. 4 is a sectional view as taken on line 4—4 of FIG. 3.
Figure 3:
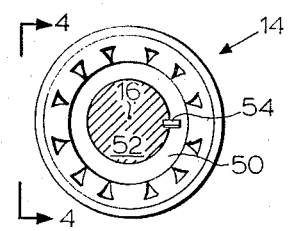
FIG. 3 is a sectional view as taken on line 3—3 of FIG. 1.

Tube 42 is disposed concentrically between core 40 and a hollow magnetic-pulse-forming conductor 84 of the type described in U.S. Patent No. 2,976,907, using core 40 as a die and using tube 42 as the workpiece. Conductor 84 has a charging circuit 88 with switches 90, 92. A predetermined high-intensity pulsed magnetic field 86 is applied by conductor 84 to radially outer surface 66. Field 86 has sufficient strength and is applied for a sufficient time to transfer the necessary energy to tube 42 and to cause groove side walls 78, 80 to bear against side walls 58, 60, respectively, and cause the material or stock of webs 82 and bars 76 to reform and fill adjacent respective grooves 56. In this way, radially outer surface 66 becomes the radially outer surface of rotor 14. Field 86 also causes respective tube ends 70, 72 to bend over and abut against end faces 48, 50. In this way ends 70, 72 are disposed radially inwardly of radially outer surface 46. Such redistribution of the material of webs 82 into respective adjacent grooves 56 is facilitated by the design of core 40 with its pointed apex portions 62 and by the design of tube 42 with its relatively thin webs 82. Before said forming operation (FIG. 5), webs 82 substantially overhang slots 74, while after such forming operation (FIG. 4), webs 82 do not substantially overhang slots 74, but rather are substantially disposed in grooves 56.

Using the aforementioned method of manufacture of squirrel-cage rotor 14 according to the invention, rotor cage 42 has the beneficial properties typical of wrought material whereby casting voids are substantially eliminated and other properties of the crystalline structure of the metal are improved, thereby assuring repeatability in the manufacture of precision squirrel-cage motors of a high performance standard.

While the present invention has been described in a preferred embodiment, it will be obvious to those skilled in the art that various modifications can be made therein within the scope of the invention. For example, slight projections from bars 76, which extend slightly in a radially outward direction from surface 46 can be machined-off to minimize slight variations in gap 18. In addition, the width in a peripheral direction of webs 82 can be substantially minimized prior to the aforementioned forming operation so that slots 74 would extend through outer surface 66 and so that tube 42 would have a cage-like shape prior to said forming operation. It is intended that the appended claims cover all such modifications.

What is claimed is:

1. A squirrel-cage rotor comprising:
   a metal tube with a longitudinal axis having a pair of axially-spaced annular end portions and having a plurality of peripherally-spaced elongate slots forming therebetween bars of trapezoidal cross-section for interconnecting said end portions; and
   a metal core coaxially supporting said tube having a pair of end faces respectively abutting said tube end portions and having a plurality of peripherally-spaced grooves with radially-outwardly-diverging groove side walls for receiving said tube bars.

2. The combination of a stator with the rotor as claimed in claim 1 comprising:
   an annular coil support with the plurality of peripherally-spaced field coils coaxially surrounding said rotor and separated therefrom by an annular gap for forming a dynamo-electric machine.

3. A squirrel-cage motor including in combination a stator and a squirrel-cage rotor being separated therefrom by an annular gap for rotation relative thereto about a common axis,
   said stator having:
   an annular coil support of laminated iron construction with a plurality of radial teeth,
   a housing in which said coil support is mounted, and
   a plurality of field coils peripherally-spaced about said axis and selectively wrapped around said teeth,
   said rotor including a core and a coaxial tube;
   said core comprising:
   an annular portion of laminated iron construction with a radially-outer surface concentric about said axis and with a pair of axially-spaced end faces, and
   a shaft portion keyed to said annular portion and journaled in said housing for rotation of said rotor relative to said stator,
   said annular portion outer surface having a plurality of peripherally-spaced helical grooves with radially-outwardly-diverging groove side walls for forming a plurality of helical apex portions therebetween; and
   said tube comprising:
   an annular wall with a concentric radially-outer surface and radially-inner surface and with axially-spaced end portions respectively overlapping said core end faces,
   said annular wall having a plurality of helical slots of similar angular spacing and helical pitch as said core apex portions so that between said slots there are defined a plurality of bar portions respectively interspaced between the helical grooves of said core and respectively received in said core grooves, said bar portions interconnecting said tube end portions and being disposed radially-inwardly of said core radially-outer surface,
   said slots having an outer circumferential width which exceeds the respective apex portions adjacent thereto.

4. An induction motor rotor comprising a core having, an annular portion of laminated iron construction with a longitudinal axis and with a radially-outer surface concentric about said axis and with a pair of axially-spaced end faces, and a shaft portion fixedly connected to said annular portion, said radially-outer surface having a plurality of peripherally-spaced grooves with radially-outwardly-diverging groove side walls defining apex portions; and a tube having an annular wall coaxial with said core with a concentric radially-outer surface and radially-inner surface and with axially-spaced end portions respectively overlapping said core end faces, said annular wall having a plurality of helical slots of similar angular spacing and pitch to said core apex portions, said slots having respective web portions which overlie the respective apex portions adjacent thereto and having radially-inwardly-diverging side walls which define a plurality of bar portions respectively interspaced between the core grooves.

References Cited
UNITED STATES PATENTS

| | | | |
|---|---|---|---|
| 1,950,197 | 3/1934 | Taylor | 310—211 |
| 2,372,590 | 3/1945 | Ljunggren | 310—211 |

MILTON O. HIRSHFIELD, *Primary Examiner.*

L. L. SMITH, *Assistant Examiner.*